May 26, 1970

E. R. DUNN 3,513,600

STEPPING MOTOR CONTROL PROVISIONS FOR MACHINE TOOL FEED MECHANISM

Filed June 14, 1967

INVENTOR
ELMAN R. DUNN

BY
Mason, Porter, Willery Brown
ATTORNEYS

INVENTOR
ELMAN R. DUNN

May 26, 1970   E. R. DUNN   3,513,600
STEPPING MOTOR CONTROL PROVISIONS FOR MACHINE TOOL FEED MECHANISM
Filed June 14, 1967   3 Sheets-Sheet 3
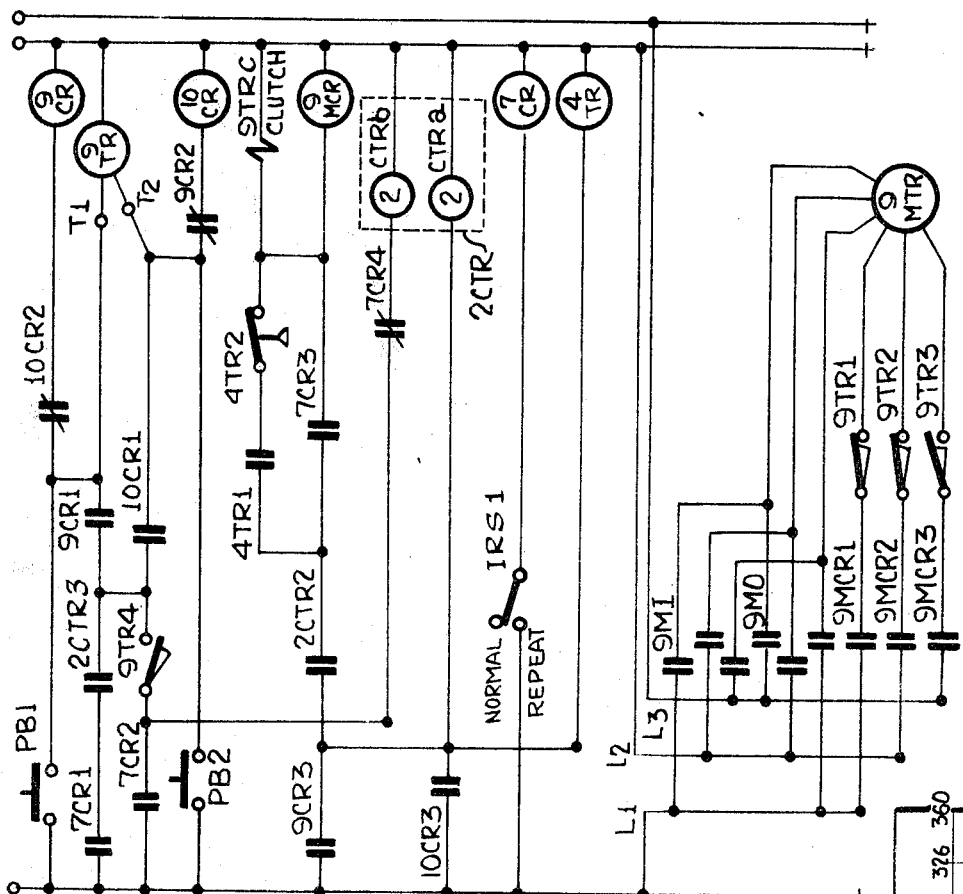
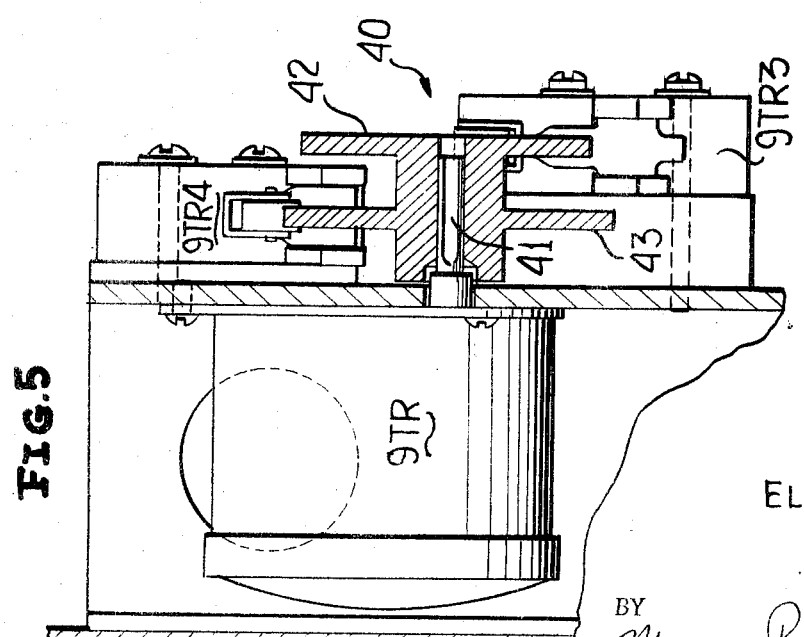
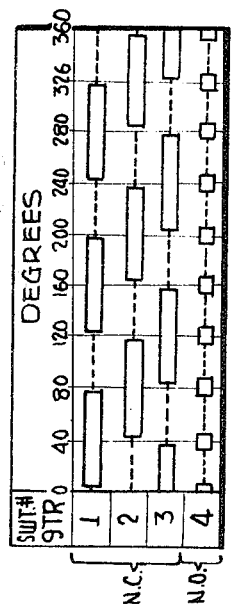
INVENTOR
ELMAN R. DUNN
BY Mason, Porter, Diller & Brown
ATTORNEYS United States Patent Office 3,513,600
Patented May 26, 1970

3,513,600
STEPPING MOTOR CONTROL PROVISIONS FOR MACHINE TOOL FEED MECHANISM
Elman R. Dunn, Roscoe, Ill., assignor, by mesne assignments, to Litton Industries, Inc., a corporation of Delaware
Filed June 14, 1967, Ser. No. 646,107
Int. Cl. B24b 51/00
U.S. Cl. 51—165                                    13 Claims

ABSTRACT OF THE DISCLOSURE

This disclosure relates to means for advancing and retracting movable elements in a machine tool including the abrasive disc or discs of a disc grinder. A stepping motor is connected to the feed mechanism of the movable machine tool elements. The stepping motor includes two windings for either continuous or intermittent rotation of a feed screw. The means for controlling the intermittent rotation of the motor includes a plurality of limit switches arranged for operation by a multiple lobe cam. The cam is driven by a motorized gear reduction unit which includes a clutch and brake mechanism. Disengagement of the clutch and operation of the brake stops rotation of the cam. The motor may be actuated to provide continuous rotation to the cam to thereby provide a continuous series of steps by the stepping motor for rapid incremental movement of the movable machine tool element toward or away from its operative position. The cam operating motor, brake and clutch combination may be actuated to produce an indefinite number of continuous steps or a predetermined number of steps or a single step of the stepping motor, in either direction of rotation.

---

This invention relates to disc grinders, particularly to the use of a stepping motor for actuating the mechanism for feeding the discs toward and from each other by increments.

A device similar to the device herein disclosed is shown in the inventor's U.S. Pat. No. 3,309,820, granted Mar. 21, 1967. In the aforementioned patent a stepping motor is disclosed for imparting movement to the feed mechanism of movable machine tool elements. However, the means for controlling the stepping motor as described herein differs from the stepping motor control means disclosed in the aforementioned patent. In that patent a plurality of limit switches for actuating a stepping motor are opened and closed in a predetermined sequence through the actuation of such switches by a corresponding plurality of rotatable cams. Such cams are driven continuously by a switch actuating motor coupled thereto via suitable friction drive apparatus. Actuation of the cams by the motor actuates the feed mechanism stepping motor in a series of successive steps as long as the switch actuating cams are rotated by the cam operating motor. In order to move the feed mechanism through a single increment or a predetermined number of increments of feed, a separate solenoid operated ratchet mechanism must be provided in cooperation with the switch actuating cams to impart limited rotation to such cams. The degree of rotation imparted to the cams determines the number of switch actuations and, thus, determines the number of steps through which the feed mechanism stepping motor will turn.

The present invention, however, represents an improvement over the disclosure of the aforementioned patent inasmuch as the present invention provides the utilization of a single multiple lobe cam in cooperation with a plurality of stepping motor controlling limit switches. Thus, the present invention eliminates the need for a plurality of single lobe cams arranged in predetermined interrelationship.

Further, the present invention provides the utilization of a single motor for driving the switch actuating multiple lobe cam either continuously or intermittently, thus eliminating the need for two separate cam driving mechanisms. The cam driving motor of the present invention may be driven continuously to provide continuous cam rotation and an indefinite number of continuous steps by the feed mechanism controlling stepping motor. Alternatively, the stepping motor may be rotated through a single or a predetermined number of steps by the provision of a counter which is responsive to the rotation of the single multiple lobe cam and which operates to disconnect the switch operating motor from the switch actuating cam upon the rotation of the stepping motor through a single or predetermined number of steps.

In accordance with the foregoing discussion, it is an object of this invention to provide an improved machine tool feed mechanism operable to drive a movable machine tool element through a single increment of movement a predetermined number of such increments or an indefinite number of continuous increments.

A further object of this invention is to provide a machine tool feed mechanism having a stepping motor for controlling the movement thereof and relatively simple apparatus for controlling the rotation of such stepping motor.

Another object of this invention is to provide a single switch actuating means for controlling the movement of a stepping motor for accurately providing limited adjustment of a feed mechanism of a machine tool.

An additional object of this invention is to provide simplified control apparatus for controlling the actuation of motor control switches.

A still further object of this invention is to provide simplified and improved apparatus for controlling the limited adjustment of a feed mechanism through a predetermined or indefinite number of steps in order to change the zone of operation of an abrasive disc slide or other machine tool element.

With the above and other objects in view that will hereinafter appear, the nature of the invention will be more clearly understood by reference to the following detailed description, the appended claims and the several views illustrated in the accompanying drawings.

In the drawings:

FIG. 5 is an end view of the switch actuating cam of FIG. 3 with parts shown in section and shows the cam driving motor mounted in cooperation with the cam.

FIG. 6 is an electrical circuit diagram representing the electrical circuit used to control the operation of a plurality of stepping motor control switches.

FIG. 7 is a chart representing the sequence of opening and closing of the cam-controlled switches of FIG. 6.

Figure 1:
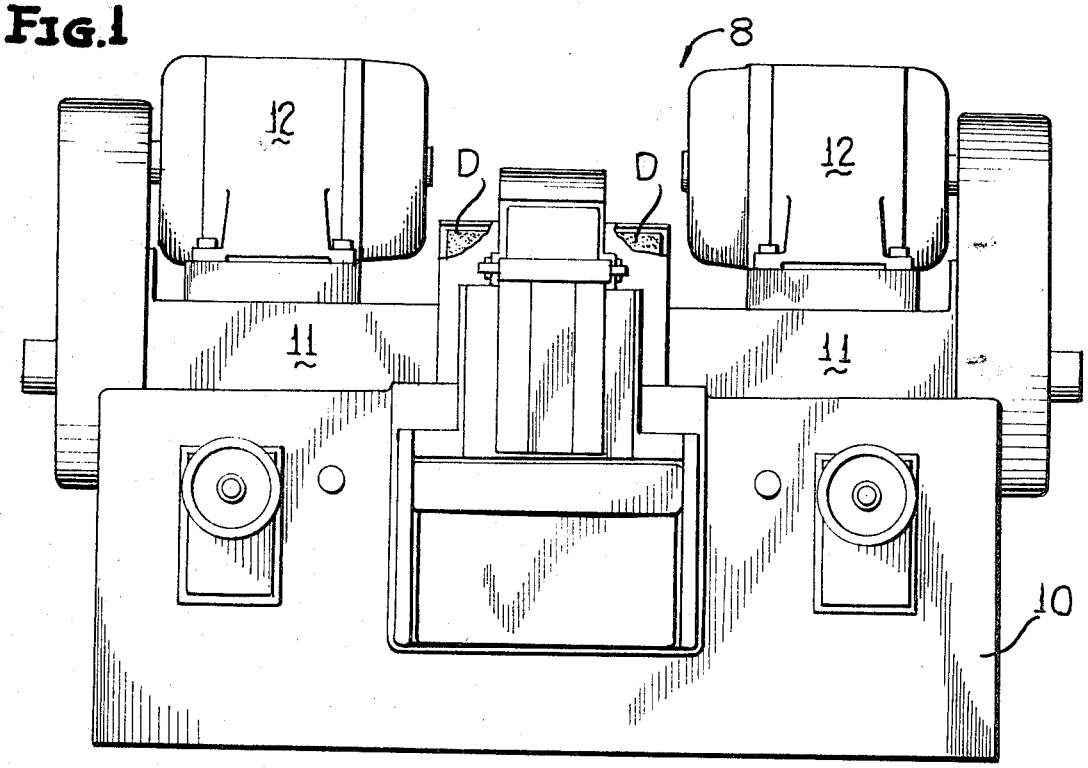
FIG. 1 is a front elevational view of a conventional horizontal double disc grinder with parts broken away, and shows a pair of slidably mounted abrasive discs.

Referring now to the drawings in detail, there is shown in FIG. 1 a double disc grinder, generally indicated by the numeral 8, having a pair of abrasive grinding discs D rotatably supported upon a pair of slides 11 which are movable longitudinally along a grinder bed 10. A pair of grinder driving motors 12 are connected to the abrasive discs through suitably chosen belt drive apparatus for imparting rotational movement of such discs.

Figure 2:
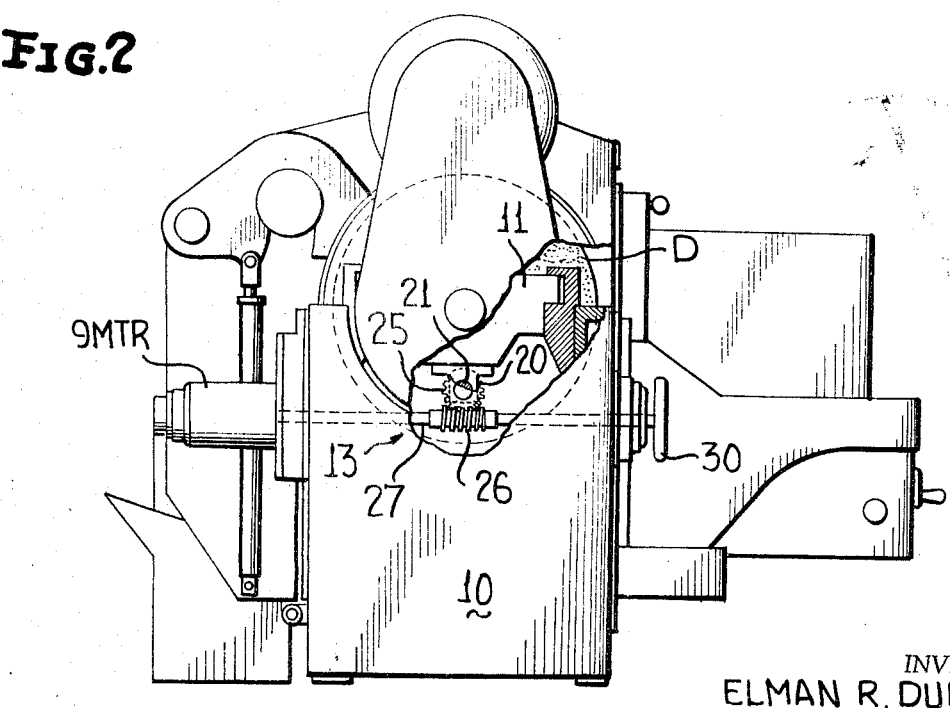
FIG. 2 is an end elevational view of the grinder of FIG. 1 and shows a stepping motor in connection with a grinding disc feed mechanism.

The disc supporting slides 11 have connected thereto a feed mechanism, generally indicated by the numeral 13 and best seen in FIG. 2. The feed mechanism 13 may, conveniently, include a nut 20 fixedly attached to the underside of the slide 11 and a feed screw 21 rotatably mounted in the grinder bed 10 and in operative threaded engagement with the nut 20.

The feed screw 21 may be rotated through the provision of a worm wheel 25 mounted on the feed screw in operative relation with a worm gear 26 provided on a shaft 27 which is rotatably supported in the grinder bed 10. The worm gear 26 may be rotated manually by a hand wheel 30 or by a suitably provided motor 9MTR.

The motor 9MTR may be any of a number of commercially available stepping motors having a first winding for imparting continuous rotation thereto and having a second winding for providing step or intermittent rotation. Stepping or intermittent rotation of the motor 9MTR is effected through the actuation of three motor controlling limit switches 9TR1, 9TR2 and 9TR3 mounted for actuation by a switch actuating cam assembly 40. The cam assembly 40 includes a rotatably mounted shaft 41 to which is fixedly attached a pair of switch operating cams 42 and 43. The switch actuating cam 42 comprises a solitary multi-lobe cam in camming relation to the three stepping motor actuating switches 9TR1, 9TR2 and 9TR3. These switches may be any of a number of commercially available limit switches suitable for actuation in response to the rotation of the multi-lobe cam 42. The second cam 43 mounted upon the shaft 41 cooperates with a further limit switch 9TR4 in a manner to be described more fully hereinafter.

Figure 4:
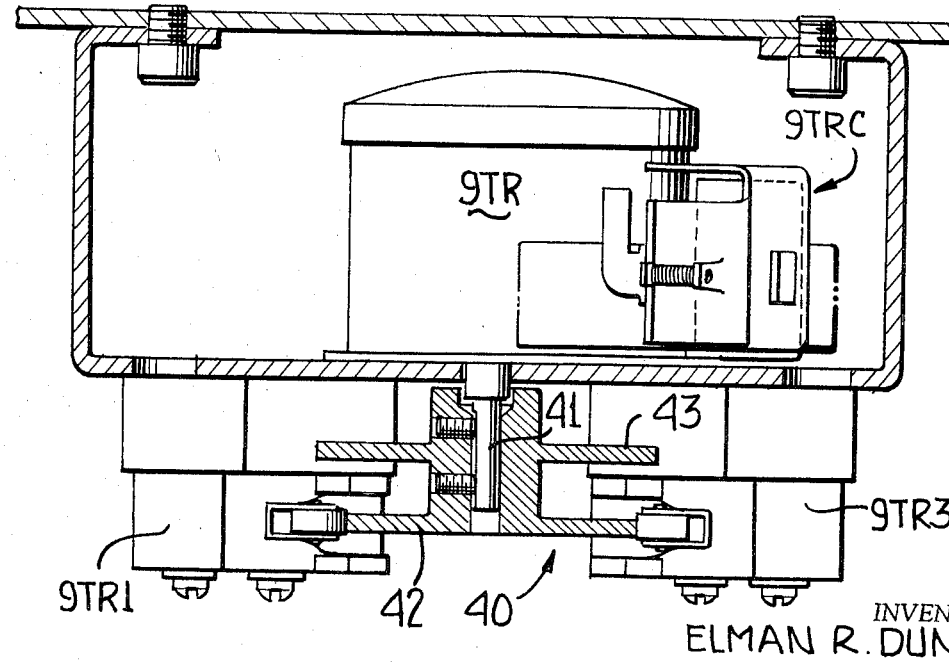
FIG. 4 is a plan view of the switch actuating cam with parts shown in section and shows a clutch and brake operating solenoid mounted in cooperation with the cam driving motor.

A cam driving or switch motor 9TR, best seen in FIGS. 4 and 5, is mounted in operative relationship to the cam assembly 40 for imparting rotation to the switch actuating cams 42 and 43 via the geared reducer element of the motor 9TR, and the output shaft thereof. Conveniently, the output shaft of the motor-reducer combination 9TR may comprise the cam assembly shaft 41.

Figure 3:
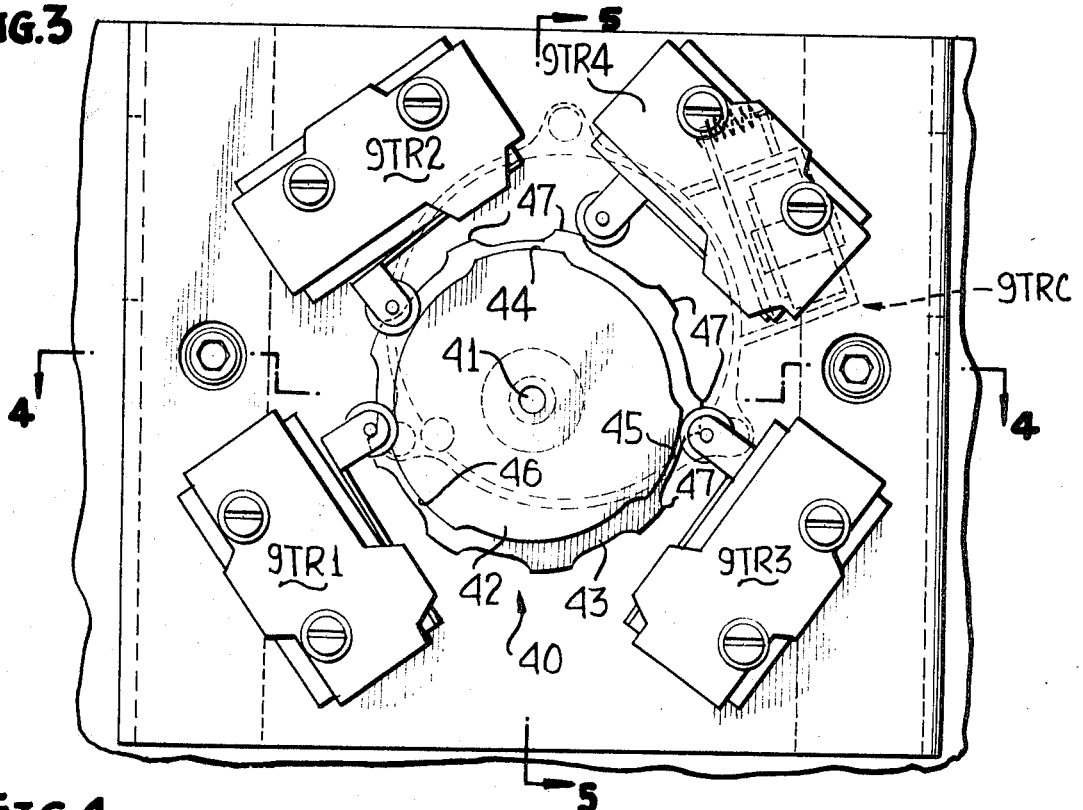
FIG. 3 is an enlarged front elevational view of a switch actuating cam and shows a plurality of stepping motor control switches in cooperation with the cam.

The cam driving motor 9TR may be selected from any of a number of commercially available motors including a clutch-brake mechanism and gear reduction coupling the motor with the driving output shaft. A clutch and brake operating solenoid 9TRC, best seen in FIGS. 3 and 4, is mounted upon the switch motor 9TR to actuate the clutch and brake mechanism of such motor.

Upon operation of the switch motor 9TR the switch operating cams 42 and 43 are rotated and the cam lobes 44, 45 and 46 of the cam 42 actuate the three stepping motor control switches 9TR1, 9TR2 and 9TR3 in a predetermined sequence of operation. A series of cam lobes 47 of the switch actuating cam 43 actuates the additional or counting switch 9TR4 for each operation of the three stepping motor control switches corresponding to a single stepping operation of the stepping motor 9MTR.

OPERATION

In the utilization of a typical disc grinder, when workpieces tend toward oversize limits, it becomes necessary to advance the abrasive discs D inwardly to maintain the grinding of such workpieces within their predefined limits. The feed mechanism 13 is actuated by the stepping motor 9MTR which is energized from a suitable three-phase source. Energization of the motor 9MTR through any single pair of input terminals provides a single step operation of that motor. Thus, to provide a sequence of such steps it is necessary to close the switches 9TR1, 9TR2 and 9TR3 in the predetermined sequence illustrated in the chart of FIG. 7. Reversing the sequence of closure of the three stepping motor control switches reverses the direction of stepping of that motor thus causing movement of the feed mechanism 13 in reverse direction.

To effect inward movement of the feed mechanism the manually operable, normally open switch PB1 seen in FIG. 6, is closed by the machine operator. Closure of the switch PB1 effects energization of the increment feed IN control relay 9CR, thus causing closure of the 9CR control relay contacts 9CR1 and 9CR3. Closure of the 9CR3 contact effects energization of the closing coil 2CTRa of a pulse counting relay 2CTR. The energization of the coil 2CTRa of the counting relay 2CTR causes closure of the contact 2CTR3 of that relay and thus provides a holding circuit for the control relay 9CR via the now closed contacts 2CTR3 and 9CR1. Further, the closing of the contacts 2CTR3 and 9CR1 energizes the switch motor 9TR via these closed contacts and a "forward energization" terminal T1 of the motor 9TR. The motor 9TR, then, rotates in the forward drive direction.

The initial energization of the control relay 9CR provides energization of a timer relay 4TR as well as the closing coil 2CTRa of a pulse counting relay 2CTR. Energization of the timer relay 4TR and the closing coil 2CTRa effects closure of contacts 4TR1 and 2CTR2, respectively. Thus, the clutch solenoid 9TRC and the motor control relay 9MCR are energized through the circuit comprising the contacts 9CR3, 2CTR2, 4TR1 and the normally closed timer relay switch 4TR2. Energization of the clutch solenoid 9TRC provides rotation of the cams 42 and 43 by coupling the switch motor 9TR to the shaft 41. Energization of the motor control relay 9MCR closes the motor control relay contacts 9MCR1, 9MCR2 and 9MCR3 to place the motor control switches 9TR1, 9TR2 and 9TR3 in circuit control relation with the motor 9MTR. Rotation of the cam 43 by the switch motor 9TR causes the stepping motor control switches 9TR1, 9TR2 and 9TR3 to close in the sequence illustrated in the chart of FIG. 7 to provide a predetermined sequence of stepping operations by the motor 9MTR. Rotation of the cam 43 provides periodic closure of the cam actuated switch 9TR4 in accordance with the operation represented in the chart of FIG. 7 and to provide a periodic series of pulses to a contact opening coil 2CTRb of the pulse counting relay 2CTR. Inasmuch as each pulse provided to the pulse counting relay 2CTR via the cam operated switch 9TR4 represents a single stepping operation of the stepping motor 9MTR, adjustment of the pulse counting relay 2CTR allows the limiting of the number of stepping operations as desired.

Once the pulse counting relay 2CTR has been adjusted for a predetermined number of stepping operations, the contact opening coil 2CTRb will, upon the occurrence of the predetermined number of pulses, cause opening of the counter relay contact 2CTR3 and 2CTR2.

The opening of the contacts 2CTR2 effects immediate deenergization of the clutch solenoid 9TRC to cause clutch disengagement and engagement of the switch motor brake. Similarly, opening of the contacts 2CTR2 provide deenergization of the motor control relay 9MCR to effect opening of the contacts 9MCR1, 9MCR2 and 9MCR3, thus opening the control circuit of the stepping motor 9MTR to terminating stepping rotation thereof.

Both the control relay 9CR and the switch motor 9TR are deenergized by the opening of the counter relay contact 2CTR3 and, thus, no further operation of the stepping motor 9MTR is possible without a further actuation of the increment IN switch PB1 by the machine operator.

Should the pulse counting relay 2CTR fail to "count out" upon the occurrence of the predetermined number of pulses provided by the switch 9TR4, the timer relay 4TR will, upon the passage of a predetermined amount of time, effect opening of the normally closed timer relay switch 4TR2 to cause clutch disengagement and opening of the motor control relay contacts. Thus, there is no possibility of the motor 9MTR driving the feed mechanism of the machine tool beyond safe limits.

Reverse opeartion or outward movement of the feed mechanism by reverse rotation of the stepping motor 9MTR is effected in much the same manner as set forth hereinbefore with respect to the inward movement of such mechanism. To initiate such outward or reverse movement, the machine opeartor initially presses the normally open manually operable switch PB2 to effect energization of the increment feed OUT control relay 10CR. It should be noted that closure of either of the switches PB1 or PB2 prevents energization of the incorrect increment feed control relay through the opening of one or the other of the two normally closed contact pairs 9CR2 and 10CR2. Energization of the stepping motor for forward or reverse operation may be provided through the employment of conventional relay operated motor reverse contacts 9MI and 9MO.

Energization of the increment feed OUT relay 10CR closes contacts 10CR1 and 10CR3. The contacts 10CR1 and 10CR3 effect energization of the closing coil 2CTRa of the pulse counting relay 2CTR to close the counting relay contacts 2CTR3. Thus, the switch motor 9TR is energized for reverse rotation via the contacts 2CTR3 and 10CR1 and the reverse energization terminal T2.

Similarly, energization of the closing coil 2CTRa effects closure of the contact 2CTR2 and energization of the timer relay 4TR via the contact 10CR3. Thus, once again, the timer relay contact 4TR1 is closed and the clutch solenoid 9TRC and the motor control relay 9MCR are energized via the contacts 10CR3, 2CTR2, 4TR1 and the normally closed timer relay switch 4TR2.

With the switch motor clutch engaged and the motor control contacts 9MCR1, 9MCR2 and 9MCR3 closed reverse rotation of the stepping motor 9MTR is begun and a series of pulses is supplied to the opening coil 2CTRb by the periodic opening and closing of the cam operated switch 9TR4. As set forth hereinbefore with respect to the forward operation of the feeding mechanism, the counting relay 2CTR is adjusted for a predetermined number of stepping operations of the stepping motor 9MTR. Upon completion of the predetermined number of stepping operations, the shunting relay contacts 2CTR2 and 2CTR3 are opened to complete the desired reverse operation stepping sequence.

The timer relay 4TR begins to time the reverse sequence operation upon the closure of the control relay contacts 10CR3 and limits the duration of the reverse sequence operation as set forth hereinbefore with respect to the forward operation of the stepping motor 9MTR.

Should it be desirable to operate the stepping motor 9MTR through an indefinite number of continuous steps in either the forward or reverse directions thereof, an increment feed selector switch IRS1 is "thrown" to its "repeat" position to effect closure thereof. Depression of either the increment feed IN switch PB1 or the increment feed OUT switch PB2 and maintaining the selected switch closed results in a continuous stepping of the motor 9MTR during the time the selected increment feed switch is maintained closed.

Assuming that the increment feed IN switch PB1 has been depressed subsequent to the closure of the increment feed repeat selector switch IRS1, the switch motor 9TR is energized for forward operation via the increment feed IN switch PB1. Similarly, control relay 9CR is energized to effect closure of control relay contacts 9CR3. The closing coil 2CTRa of the counter relay 2CTR is energized via contacts 9CR3 to close counter relay contacts 2CTR2. Energization of the control relay 7CR provides closure of the control relay contacts 7CR3 which are connected in parallel with the timer relay contacts 4TR1 and the normally closed timer switch 4TR2. Thus, the clutch solenoid 9TRC and motor control relay 9MCR are energized and the timer relay 4TR is ineffective to limit the time of operation of the stepping motor 9MTR. Similarly, the contact opening coil 2CTRb is prevented from limiting the number of stepping operations of the motor 9MTR due to the opening of the control relay contacts 7CR4.

Energization of the control relay 7CR further causes opening of the control relay contacts 7CR1 to render ineffective the holding circuit of the control relay 9CR. Thus, the control relay 9CR is maintained energized only as long as the increment feed IN switch PB1 is maintained closed.

Upon release of the increment feed IN switch PB1, the stepping of the motor 9MTR is terminated. However, should the increment feed IN switch PB1 be released at a time when only one of the cam actuated switches 9TR1, 9TR2 and 9TR3 is closed, the further cam controlled switch 9TR4 will be closed, as is apparent from the chart of FIG. 7, and the control relay 9CR and switch motor 9TR will be maintained energized via the now closed control relay contact 7CR2, the cam actuated switch 9TR4 and the control relay contacts 9CR1. Thus, the cams 42 and 43 will continue to rotate only so far as is necessary to place the cam actuated switches 9TR1, 9TR2 and 9TR3 in condition for the initiation of a further operation.

Finally, opening of the increment feed repeat selector switch IRS1 places the circuit of FIG. 6 in condition for further desired operations of the stepping motor 9MTR.

The provisions hereinbefore described represent a preferred embodiment of the invention. However, it will be readily apparent that many variations may be made in such preferred embodiment, as for example, the substitution of solid state switching devices for switches and relays hereinbefore described. Accordingly, the scope and spirit of the invention is defined by the appended claims.

What is claimed is:
1. In a machine tool having movable elements,
   (a) means for actuating one or more of said elements comprising
   (b) a stepping motor,
   (c) a plurality of switches for actuating said motor by applying impulses thereto in a predetermined sequence,
   (d) means for actuating said switches in a predetermined sequence to rotate said motor intermittently comprising
   (e) a single multiple lobe cam operatively engaging all of said switches for actuating said switches in the predetermined sequence,
   (f) and a single driving motor for rotating said cam continuously or intermittently and
   (g) control means for controlling said driving motor to provide either continuous or intermittent rotation of said cam.
2. Apparatus according to claim 1 wherein said driving motor being a switch motor for selectively providing both continuous and intermittent rotation of said cam, said control means including means for limiting the time of energization of the switch motor to provide a determined number of switch operations and means for continuously energizing said switch motor for continuous switch operation.
3. Apparatus according to claim 1 wherein said driving means comprises means for connecting and disconnecting said driving means and said cam, said control means including means for actuating said means for connecting and disconnecting including means responsive to a predetermined number of switch operations to effect disconnection of said driving means and said cam.
4. Apparatus according to claim 1, said control means further comprising a second cam and counter means actuated by said second cam for counting the feed impulses directed to said stepping motor by said plurality of switches and means for halting rotation of said second cam after a predetermined number of said pulses to halt stepping of said stepping motor.

5. In a machine tool having movable elements,
(a) means for actuating one or more of said elements comprising
(b) a stepping motor,
(c) a plurality of switches for actuating said motor,
(d) means for opening and closing said switches in a predetermined sequence to rotate said stepping motor intermittently including
(e) a single selectively continuously and intermittently operable switch motor, and
(f) means for controlling said continuously and intermittently operable switch motor for selectively providing both continuous and intermittent operation thereof to selectively provide continuous opening and closing of said switches and a limited predetermined number of openings and closings of said switches by said switch motor.

6. Apparatus according to claim 5 wherein said driving means further comprises coupling means for connecting and disconnecting said switch motor with said means for opening and closing said switches for imparting driving movement to said switches from said switch motor during both continuous and limited actuation of said switches.

7. Apparatus according to claim 6 wherein said means for controlling further comprises means for activating and deactivating said coupling means selectively for continuous application of driving motion from said switch motor to said switches and limited application of driving motion from said switch motor to said switches for limited switch operations.

8. Apparatus according to claim 5 wherein said means for controlling further comprises counter means for terminating switch motor operation upon completion of said predetermined sequence.

9. Apparatus according to claim 7 wherein said means for controlling further comprises counter means effective during intermittent operation of said switch motor for terminating switch motor operation and deactivating said coupling means upon completion of said predetermined sequence.

10. Apparatus according to claim 8 further comprising timer means for terminating switch motor operation within a predetermined time upon failure of said counter means to terminate operation thereof upon completion of said predetermined sequence.

11. In a machine tool having movable elements,
(a) means for actuating one or more of said elements comprising
(b) a stepping motor,
(c) a plurality of switches for actuating said stepping motor,
(d) means for actuating said switches in a predetermined sequence to rotate said stepping motor intermittently,
(e) means for opening and closing said switches and
(f) driving means including a switch motor selectively operable in forward and reverse directions, and
(g) means for controlling said switch motor for selectively providing operation thereof in both of said forward and reverse directions by reversal of the direction of rotation thereof.

12. Apparatus according to claim 11 wherein said means for controlling further comprises means terminating switch motor operation upon completion of a predetermined number of switch operations during either forward or reverse operation of said switch motor.

13. Apparatus according to claim 11 wherein said means for controlling further comprises means for providing continuous rotation of said switch motor in either of said forward and reverse directions for continuous switch operation and continuous stepping motor operation in forward and reverse directions of the stepping motor.

References Cited
UNITED STATES PATENTS

| | | | |
|---|---|---|---|
| 2,334,581 | 11/1943 | Pyne | 51—165 |
| 2,881,568 | 4/1959 | Hahn et al. | 51—165 X |
| 3,309,820 | 3/1967 | Dunn | 51—165 |

HAROLD D. WHITEHEAD, Primary Examiner

U.S. Cl. X.R.

51—111